United States Patent [19]

Boffelli

[11] Patent Number: 4,657,127

[45] Date of Patent: Apr. 14, 1987

[54] CLUTCH FOR LINKING A COMPRESSOR WITH A DRIVE MEANS THEREFOR

[75] Inventor: Pier C. Boffelli, San Donato Milanese, Italy

[73] Assignee: Baruffaldi Frizioni SPA, San Donato Milanese, Italy

[21] Appl. No.: 744,121

[22] Filed: Jun. 12, 1985

[30] Foreign Application Priority Data

Jun. 19, 1984 [IT] Italy .............................. 22329/84[U]
Jan. 16, 1985 [IT] Italy .............................. 20531/85[U]

[51] Int. Cl.⁴ ..................... F16D 25/063; F16D 25/08
[52] U.S. Cl. ............................ 192/70.27; 192/85 CA; 192/91 A
[58] Field of Search .......... 192/70.27, 85 CA, 85 AA, 192/91 A, 91 R; 188/170

[56] References Cited

U.S. PATENT DOCUMENTS 2,709,926 6/1955 Jandasek ....................... 192/91 A X
3,804,219 4/1974 Cummings, III .......... 192/85 CA X
3,831,713 8/1974 Muller et al. ...................... 188/170
3,893,556 7/1975 Leck Jr. et al. .................. 192/91 A
4,129,204 12/1978 Hedgecock ..................... 188/170 X
4,366,890 1/1983 Suckow ...................... 192/85 CA X
4,561,827 12/1985 Beaumont .................... 192/91 A X Primary Examiner—Rodney H. Bonck
Assistant Examiner—David A. Testardi
Attorney, Agent, or Firm—Karl F. Ross; Herbert Dubno

[57] ABSTRACT

A clutch is provided for linking a compressor with a drive therefor, particularly for heavy vehicles. The clutch includes a rotatable housing linked to the drive mounted in bearings of a clutch casing, the housing carrying on its outside a pack of clutch rings which alternate with a pack of clutch rings carried on the inside of a sliding, rotatable drum which is linked to the compressor. The pack of clutch rings are normally compressed together by springs and can be released by a pneumatically-operable piston which comes into play by build-up of air pressure and presses against part of the drum against the resilient bias.

6 Claims, 2 Drawing Figures

CLUTCH FOR LINKING A COMPRESSOR WITH A DRIVE MEANS THEREFOR

BACKGROUND OF THE INVENTION

1. Field of the Invention

This invention relates to a clutch for linking a compressor with a drive means therefor.

2. Background of the Invention

Heavy vehicles, such as lorries, are normally fitted with a pneumatic braking unit and other pneumatically-controlled systems with air supplied by a compressor activated by the engine via a transmission, usually with gears, which maintains operating pressure in the pneumatic system or systems.

When there is no consumption of air, for example for braking, usually an automatic valve discharges any excess pressure in the system. Further savings in running can however be achieved by disengagement of the compressor when the pressure in the pneumatic system is equal to the maximum desired value and, reconnecting it as soon as its activation becomes necessary to restore the working pressure in the pneumatic system. In this way, there is a constant saving in fuel, since activation of the compressor, which takes power from the engine, only occurs for the time required to recharge it to compensate for the effective air consumption for braking, etc. without discharging the excess pressure to no purpose.

To this effect, compressors have been constructed which are fitted with a pneumatic disengagement clutch, but these constructions are complex and require substantial modifications to the structure of the compressor to contain the overall volume of space, which is high, and in addition induce considerable bending stresses on the compressor shaft itself and overload on its supports, produced by the necessary larger distance of application of radial thrust due to the drive gearing, which often requires over-dimensioning of the compressor shaft and its supports.

SUMMARY OF THE INVENTION

According to the present invention, there is provided a clutch for linking a compressor with a drive means therefor, the clutch including first rotatable coupling means for coupling the clutch to the drive means and second rotatable coupling means for coupling the clutch to the compressor, the clutch further including a rotatable drum, which is joined in an axially slidable manner to one of said coupling means so as to be able to rotate therewith and which carries a first set of axially moveable clutch rings, and an inner rotatable housing joined to the other of said coupling means, said housing carrying on its outside a second set of axially moveable clutch rings, the rings of said first set alternating with the rings of said second set thereby forming a pack of clutch rings, there being resilient means acting between said drum and part of said one coupling means to press the clutch rings together thereby to transmit drive to the compressor, and there being a pneumatically operable piston actuable against the bias of said resilient means to relieve the pressure applied by said resilient means on the clutch rings, thereby to disengage said drive.

Preferably, the piston is annular and acts on a thrust ring which is rotationally blocked and slides axially in an appropriate manner against further resilient means, the thrust ring pressing against the sliding drum on activation of the piston. Preferably, the housing is maintained in a central position by means of a rotating support mechanism, supported by an external clutch housing and at one end by means of another rotating support mechanism, supported by said second rotatable coupling means, which may be in the form of a flanged sleeve. The relative distance between the rotating support mechanisms and a keying position of the drive means, which may including gearing, being such as to produce a radial load on the compressor shaft substantially equal to less than the radial load transmitted by the drive means.

In another embodiment, the clutch may comprise an axially moveable annular piston in a chamber made in the base of the outer clutch body, the piston having a head surface facing the drum linked such that it rotates relative to the compressor shaft to which the clutch is applied, the drum acting under the action of the resilient means acting on the pack of clutch rings linked, such that they rotate when clamped, to a shaft emerging from the clutch, carrying the coupling mechanism to the engine (said first rotatable coupling means) and a sleeve coupled to the shaft of the compressor. The piston may be arranged to rotate freely in its own seating and acting, when activated, with its own head on the drum against the bias of the resilient means. The piston may be inserted with radial play in its seating, the retention capacity on the respective internal and external cylindrical surfaces of the piston and of the seating being achieved by means of O-rings.

The resilient means acting on the drum can consist of springs of a suitable cup type, with sufficient axial preloading to apply thrust to the pack of clutch rings to transmit torque by friction from the clutch shaft to the compressor shaft for its activation and with sufficient overall elastic deformation to afford free rotation of the clutch pack rings if compressed.

BRIEF DESCRIPTION OF THE DRAWING

For a better understanding of the invention and to show how the same may be carried into effect, reference will now be made, by way of example, to the accompanying drawing, in which.

SPECIFIC DESCRIPTION

Figure 1:
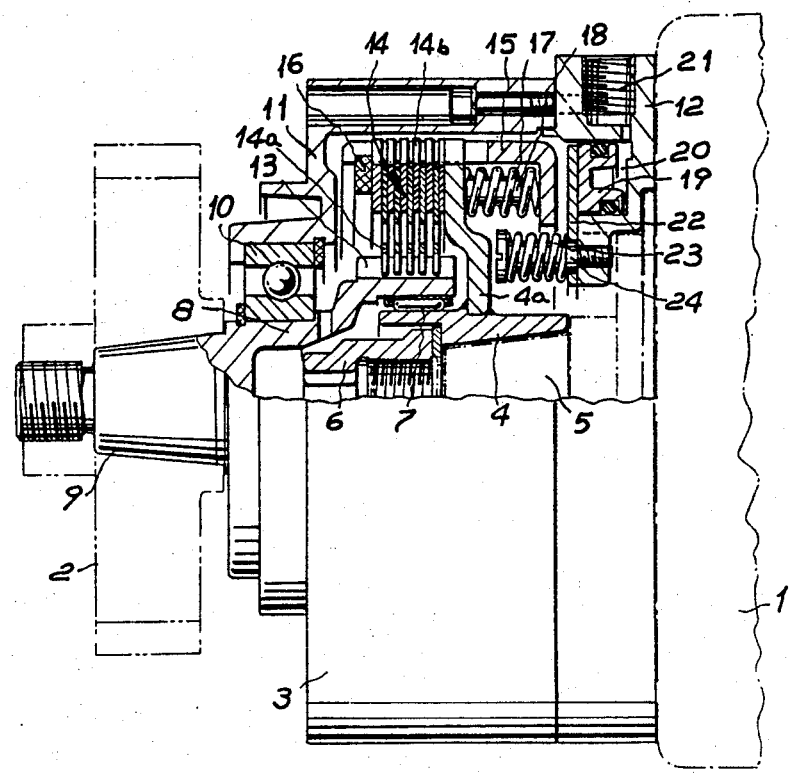
FIG. 1 is a diagrammatic side view, partly in section, of a first embodiment of clutch for linking a compressor with a drive therefor.

Referring firstly to FIG. 1, a compressor 1 is linked to drive means therefor such as gearing 2 via a clutch 3, the gearing being coupled to and driven by the vehicle engine. The clutch 3 includes a sleeve 4 with a frustoconical seating for keyed coupling with a driven shaft 5 of the compressor 1, shown by dot-and-dash lines in the Figure, locked by a threaded cap 6. The sleeve 4 is fitted with a race for a needle bearing 7 which supports a rotating body or housing 8 with a frustoconical end 9 for coupling the clutch to the gearing 2. The housing 8 is also supported by means of a bearing 10 itself supported by an outer casing 11, which is joined to the fixed compressor casing via its base 12. The outside of a cylindrical hollow end of the housing 8 has toothing 13 which engages with corresponding toothing of rings 14a of the clutch pack 14. The toothing 13 is a straight toothing which allows axial movement of the rings 14a coupled therewith.

The sleeve 4 is fitted with an external flange 4a, with external toothing which couples the flange 4a with corresponding toothing of a sliding floating drum 15 for rotation therewith, the drum 15 being likewise coupled with rings 14b of the clutch pack 14, the toothing on the drum 15 also allowing axial movement of the clutch rings 14b. The end of the drum 15 on the other side of the clutch pack 14 to the flange 4a is also fitted with a locking ring 16 against which the endmost clutch ring presses, there being resilient means in the form of compression springs 17 guided by pins 18 acting between the other end of the drum 15 and the flange 4a. The springs 17 clamp the clutch pack 14 with sufficient force normally to transmit torque to the compressor 1.

The base 12 is fitted with a seating to accomodate an annular pneumatically-actuated piston 19, circumscribing a chamber 20, fed via a coupling 21. The piston 19 acts on a ring 22, against resilient means in the form of compression springs 23, guided by screw pins 24, which are fixed with respect to the base 12, these pins 24 also constituting guides for the ring 22 whilst blocking rotation thereof. The pins 24 can also be constructed in one piece with the base 12, in the form of frontal protrusions, which allow axial displacement of the ring 22 only, blocking rotation.

In the absence of a sufficient pressure of compressed air to the chamber 20, the action of the springs 17 maintains the rings 14a, 14b in contact with each other and the compressor 1 is also thereby maintained in rotation, driven by the gearing 2, coupled to the engine.

When compressed air is fed at a sufficient pressure to the chamber 20, such as would be the case when air fed from a reservoir (not shown) being charged by the compressor 1 is approaching the predetermined maximum pressure, the piston 19 acting on the ring 22 presses the ring 22 against the resilient biases onto the adjacent face of the sliding drum 15. The drum in turn pushes the rings in the clutch pack 14 apart, thereby allowing the rotating housing 8 to idle with consequent shutdown of operation of the compressor 1.

As will be gathered from FIG. 1, the radial thrust acting on the gearing 2, at right angles to the axis of the housing 8, is counterbalanced to the reactions of the bearings 7, 10 and thus, in view of the relative distances, transmits a transverse thrust to the shaft 5 of the compressor 1 which is substantially equal to that which there would have been in the absence of the clutch 3, with a gearing directly keyed onto the shaft 5. Hence the piston 19, which does not rotate, is never in contact with rotating parts, transmitting its thrust with the interposition of the ring 20 and the latter is able to withstand sliding against the floating drum 15, in disengagement phases, for a few moments, being constructed from materials of sufficient wear-resistent properties.

The ring 22 in fact acts against the driven part of the clutch and hence as soon as there is thrust of the ring 22 against the drum 15, the latter stops in a very short period of time for disengagement of the clutch, also aided by the internal resistance of the compressor 1. Frictional contact between the ring 22 and the drum 15 lasts for a fairly limited time, and hence does not require the presence of a thrust bearing between the drum 15 and the ring 22.

Figure 2:
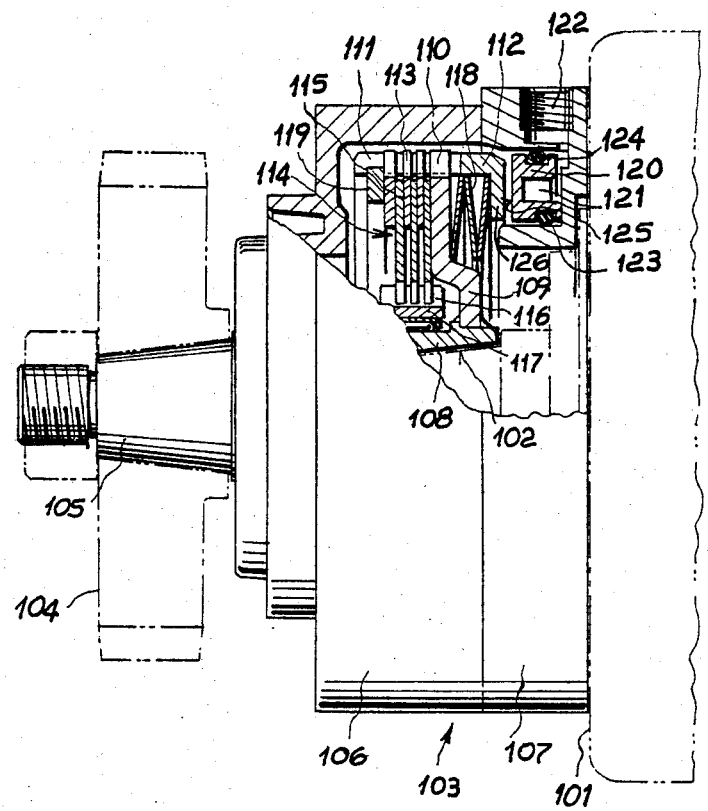
FIG. 2 is a view similar to FIG. 1 of a second embodiment of the clutch of the invention.

The clutch may also be constructed for greater compactness and simplicity, and in a particularly economic form, without any limitations or detriment to operation, as in the form illustrated in FIG. 2.

As can be seen from FIG. 2, there is a compressor 101 with a shaft 102 which links via a clutch 103 to gearing 104 by means of which the compressor 101 is linked to the vehicle engine on which it is mounted.

The clutch 103 includes a shaft 105, which is mounted on an outer housing 106, which links via a base 107, to the compressor 101. A sleeve 108 is mounted on the shaft 102 of the compressor 101, to which sleeve a flange 109 is rigidly fixed, with toothing 110 on its outer circumference, which engages with toothing 111 on a drum 112. Clutch rings having external toothing 113 of a clutch pack 114 likewise engage in the toothing 111 and clutch rings having internal toothing 115 of the clutch pack 114 engage with outer toothing 116 of an end section 117 of the shaft 105. The shaft 105 is supported in the outer casing 106 of the clutch in a similar manner to the embodiment shown in FIG. 1. Also in a similar way, the clutch rings can also move axially of themselves.

A pack of cup springs 118 is inserted between the flange 109 and the drum 112, whilst the clutch pack 114 is locked at the free end of the drum 112 by a locking ring 119.

Inside the base 107 there is a seating for an annular piston 120, circumscribing an annular chamber 121 supplied pneumatically via a threaded coupling 122, provided for linking to the pneumatic clutch disengagement system. The piston 120 has a certain amount of play between its side walls and the walls of its seating in the base 107. Retention is ensured by O-rings 123, 124, such that there is no accidental contact between the walls and the movement of the piston is not hindered. A head surface 125 of the piston 120 faces the end of an internal flange 126 of the drum 112, which flange also constitutes on its reverse side the bearing surface of the cup springs 118 bearing on the flange 109.

In the absence of air pressure in the chamber 121, the clutch remains in the engaged state, by virtue of the action of the spring 118 on the drum 112, which locks the clutch pack 114 via the ring 119. For disengagement, the chamber 121 is pressurised, via the coupling 122, and the piston 120 acts against the internal flange 126, in rotation with the shaft 102 of the compressor 101. The rings of the clutch pack 14 are accordingly allowed to come out of engagement with one another to allow the compressor itself to stop.

In the disengagement phase, when the piston 120 comes into contact with the flange 126 of the drum 112, sliding occurs with a slight angular movement between the drum 112 and the piston 120, or between the piston 120 brought rotation in contact with the drum 112, and its seating in the base 107, in relation to the respective coefficients of friction and to the operating pressure of the piston, before the compressor 101 stops due to its internal friction and its compression resistance.

This rotation is only of minor extent, and less than one complete revolution in general operating conditions. If this occurs between the drum 112 and the piston 120, it does not cause appreciable damage to the head surface 125 of the piston. In the event of relative rotation between the piston 120 and its seating, this may occur without causing damage to the side surfaces of the piston, which is, as explained, inserted with a certain amount of side play in its seating, and is held in place by the O-rings 123, 124 without detriment to their wear. This is due to the fact that oil present inside the clutch penetrates between the surfaces in relative motion, thus forming a lubricant which substantially prevents direct contact between these and takes up the heat generated.

Although two embodiments of the invention have been shown and described, it will be obvious that other adaptations and modifications can be made without departing from the true spirit and scope of the invention.

What is claimed is:

1. A compressor/clutch assembly, comprising:
   a compressor having a compressor shaft extending from one end of said compressor;
   a clutch surrounding said compressor shaft and including:
   a flanged sleeve keyed to said compressor shaft,
   a housing surrounding said sleeve and having a base connected to said end of said compressor,
   a body formed with a driven shaft at one end thereof and a cylindrical hollow member at an opposite end thereof, said hollow member being journaled by a bearing on said sleeve,
   bearing means rotatable journaling said body between the said ends thereof in said housing,
   a pack of clutch plates surrounding said hollow member with at least some of said clutch plates being coupled to said hollow member for rotation therewith but being axially movable relative to said hollow member,
   a drum surrounding said pack within said housing, said sleeve having a flange rotatably coupled to said drum but permitting axial movement of said drum relative to said sleeve, others of said clutch plate being rotatable coupled to said drum but movable axially relative thereto,
   axially effective resilient means braced between said drum and said flange and pressing said clutch plates together to engage the clutch,
   means forming an annular pneumatic cylinder in said base, and
   an annular pneumatic piston in said cylinder biased by pneumatic pressure against said drum to relieve the pressure of said resilient means and release the clutch; and
   drive means connected to said driven shaft for driving said compressor.

2. The assembly defined in claim 1 wherein said piston bears on a nonrotatable thrust ring adapted to press against said drum, said assembly further comprising other resilient means acting on said thrust ring and biasing said piston away from said drum.

3. The assembly defined in claim 1 wherein said piston is sealed by inner and outer O-rings with respect to said cylinder.

4. The assembly defined in claim 1 wherein said resilient means includes a plurality of spaced-apart coil springs braced between an inwardly extending portion of said drum and said flange.

5. The assembly defined in claim 1 wherein said resilient means comprise cup-type springs.

6. The assembly defined in claim 1 wherein said cylinder is connectable with said compressor for activation by air from said compressor when a predetermined pressure is achieved.

* * * * *